No. 660,251. Patented Oct. 23, 1900.
P. R. GRAY.
APPARATUS FOR SEPARATING WAX FROM PARAFFIN OIL.
(Application filed Dec. 2, 1899.)
(No Model.) 4 Sheets—Sheet 1.
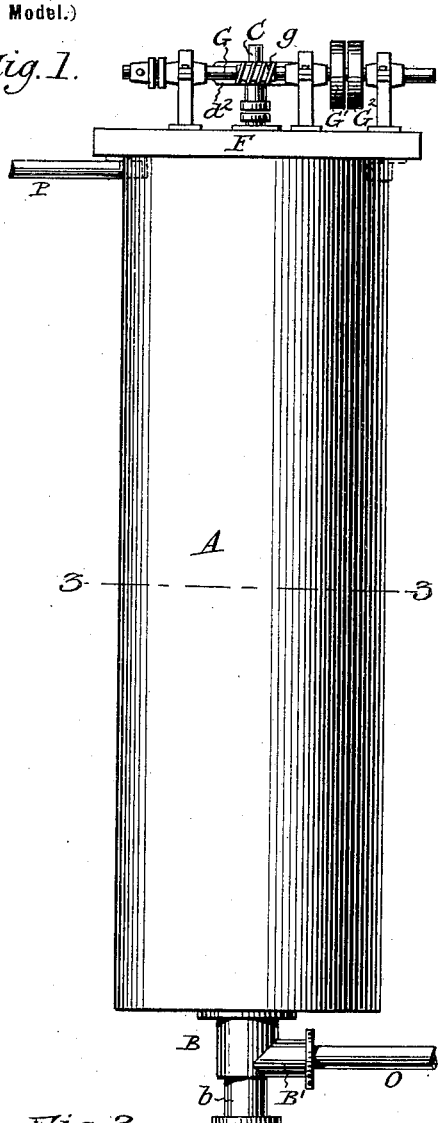
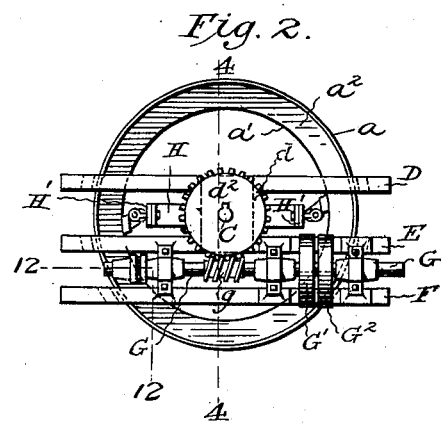
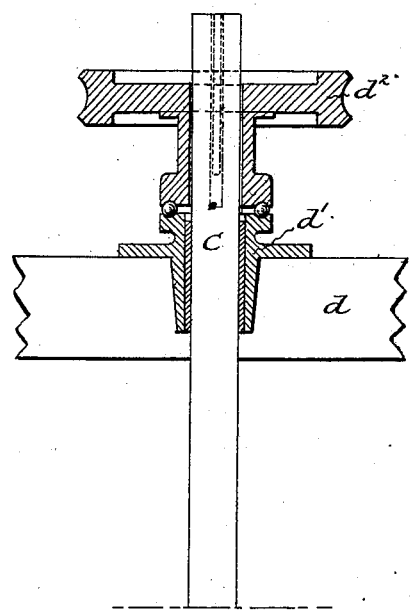
WITNESSES:
INVENTOR
P. R. Gray
BY
Baldwin, Davidson & Wright
ATTORNEYS
THE NORRIS PETERS CO., PHOTO-LITHO., WASHINGTON, D. C.

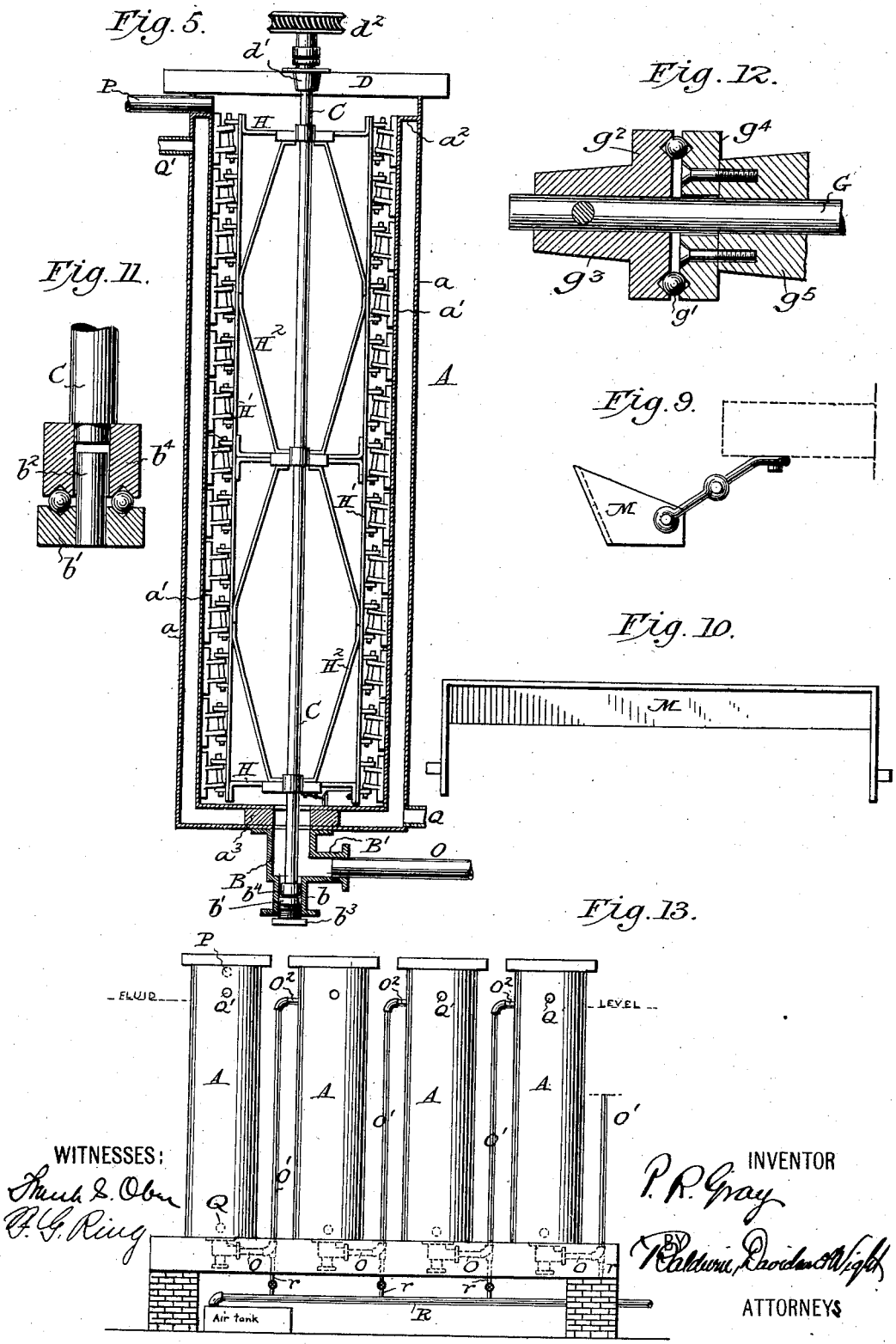

No. 660,251. Patented Oct. 23, 1900.
P. R. GRAY.
APPARATUS FOR SEPARATING WAX FROM PARAFFIN OIL.
(Application filed Dec. 2, 1899.)
(No Model.) 4 Sheets—Sheet 3.

WITNESSES:
INVENTOR
P. R. Gray
BY
ATTORNEYS

No. 660,251. Patented Oct. 23, 1900.
P. R. GRAY.
APPARATUS FOR SEPARATING WAX FROM PARAFFIN OIL.
(Application filed Dec. 2, 1899.)
(No Model.) 4 Sheets—Sheet 4.
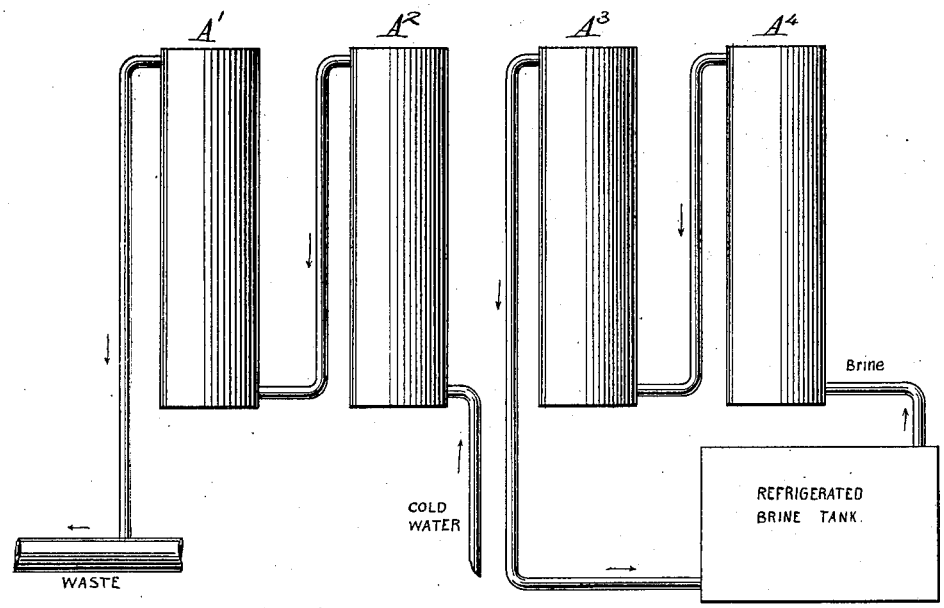
Diagram 1.
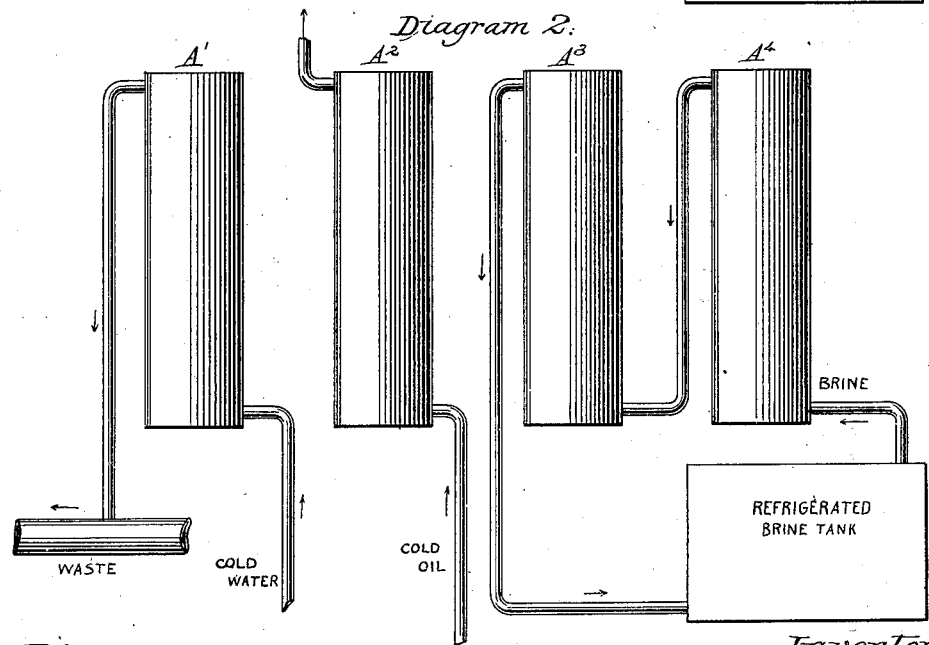
Diagram 2.
Witnesses:
Inventor:
P. R. GRAY,
by his attorneys

UNITED STATES PATENT OFFICE.

PHILANDER R. GRAY, OF ELIZABETH, NEW JERSEY.

APPARATUS FOR SEPARATING WAX FROM PARAFFIN-OIL.

SPECIFICATION forming part of Letters Patent No. 660,251, dated October 23, 1900.

Application filed December 2, 1899. Serial No. 739,032. (No model.)

*To all whom it may concern:*

Be it known that I, PHILANDER R. GRAY, a citizen of the United States, residing at Elizabeth, county of Union, State of New Jersey, have invented certain new and useful Improvements in Apparatus for Separating Wax from Paraffin-Oils and for other Purposes, of which the following is a specification.

The apparatus embodying my invention, in connection with a means for affording a sufficiently-low temperature for the purposes of the operation, is designed more especially for the solidification and separation of the wax in paraffin-oils, but is applicable to other analogous uses.

It comprises a special construction and organization of scraper mechanism operating upon the interior of a cylindrical vessel containing the oil and externally cooled and also a special organization of a series of two or more such vessels, all as hereinafter set forth in detail.

Figure 6:
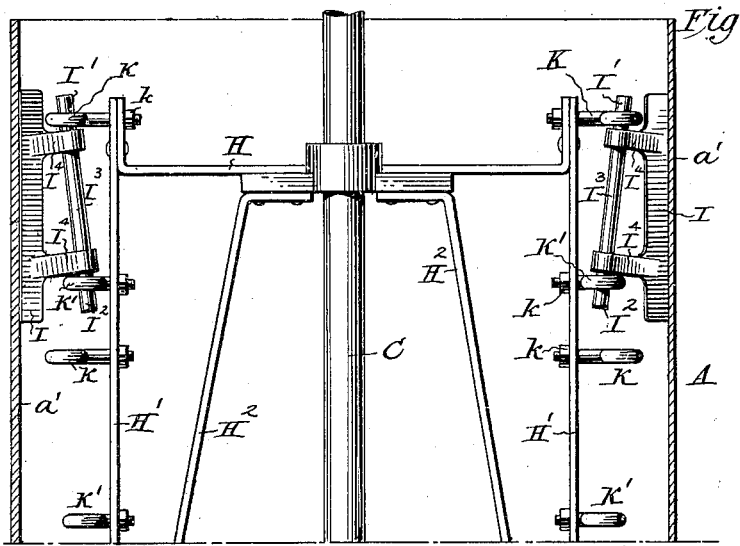
Figure 8:
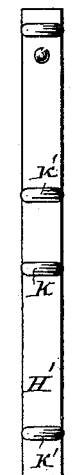
Figure 7:
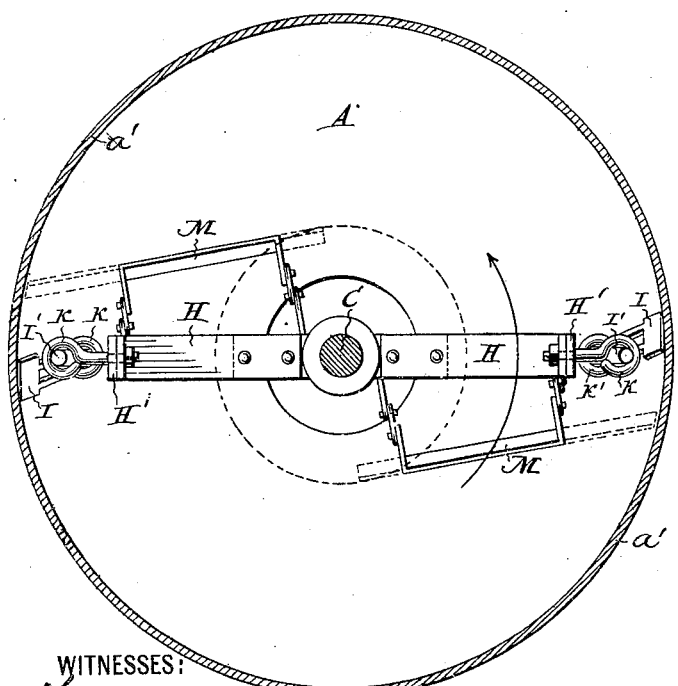

In the accompanying drawings, Figure 1 is a side elevation of one of the cylindrical vessels with the mechanism mounted at the top for rotating the scraper-shaft; Fig. 2, a plan view thereof; Fig. 3, a transverse section on the line 3 3 of Fig. 1; Fig. 4, a detail sectional view of the upper bearing of the scraper-shaft, taken on the line 4 4 of Fig. 2; Fig. 5, a vertical central section through one of the vessels, taken in a plane parallel to that of the elevation, Fig. 1; Fig. 6, an enlarged vertical sectional view showing more in detail the scraper-frame and the scrapers mounted thereon; Fig. 7, a horizontal sectional view of the same, omitting the outer wall of the double-walled cylinder; Fig. 8, an elevation of the edge of the scraper-frame. Figs. 9 and 10 are respectively detail views of a scraper acting upon the bottom of the vessel; Fig. 11, a detail vertical central sectional view of the lower bearing of the revolving scraper-shaft; Fig. 12, a similar view of the bearing of the counter-shaft at the top of the vessel through which power is applied to the scraper-shaft, the section being indicated by the line 12 12 on Fig. 2. Fig. 13 is a view in elevation indicating the arrangement of four vessels in series. Diagrams 1 and 2 show arrangements for the circulation of cooling mediums of different temperature in the jackets of the vessels.

Each vessel A is composed of an outer shell $a$ and an inner shell $a'$, affording an annular space between them, which is closed at the top by a cover $a^2$, while at the bottom a solid ring $a^3$ is interposed between the bottom of the inner and outer shells. The central opening formed by the coincident apertures in the bottom of the inner shell, the ring, and the bottom of the outer shell is covered by a casting B, having a cylindrical portion $b$, whose axis is coincident with that of said apertures and in which the bearing of the lower end of the scraper-shaft C is mounted. This bearing is shown in detail in Fig. 11. It consists of a block $b'$, having an upwardly-extending central pin $b^2$ and held in position in the part $b$ by a screw-plug $b^3$. A ring $b^4$ passes over the pin $b^2$, and between the ring and the block $b'$ are antifriction-balls. The lower end of the shaft C is reduced in diameter, and the reduced end of the shaft fits in the opening of the ring $b^4$. At the top of the vessel are arranged three parallel crossbeams D E F. Those D E are united by a bridge-piece $d$, containing a bushing $d'$, through which the shaft passes. Above the bushing a worm-wheel $d^2$ is keyed to the shaft, and between the upper face of the bushing and the lower face of the hub on the wheel antifriction-balls are interposed. The counter-shaft G, carrying a worm $g$, engaging said wheel, is mounted in bearings bridged between the bars or beams E F. These bearings are located one on each side of the worm and are constructed as shown in Fig. 12, the friction due to end thrust being relieved by the sets of antifriction-balls $g'$, which lie between the flange $g^2$ of a hub $g^3$, secured to the shaft, and a flange $g^4$ of the bearing-block $g^5$, in which the shaft G rotates. Two pulleys G' G², one fast and the other loose, are mounted upon a shaft and adapted to receive a suitably-driven belt. Upon the vertical shaft C is fixed a scraper-frame extending equally from opposite sides of the shaft in the same vertical plane. It may be constructed in any suitable manner and is shown as formed of top and bottom pieces H H and side pieces H' H' and braces H² H². A suitable space exists between the flat outer faces or edges of the scraper-frame and the inner wall of the vessel, and upon such faces of the scraper-frame are scrapers, which are constructed and mounted in the following manner: Each scraper consists of a blade I and trunnions I' I². The scraper is shown as a flat plate having a straight edge, and the axes of the trunnions and the blade are in the same flat plane. The upper trunnion is, however, closer to the edge of the scraper than is the lower one—that is to say, the axis of the trunnion is inclined relatively to the edge of the scraper. As a matter of fact the scraper-blade and trunnions may all be cast in one piece, and in the drawings I have shown a rod I³, which forms the trunnions and to which the scraper-blade is rigidly attached by projections I⁴, extending from its rear edge, and there is therefore a space between the rear edge of the scraper-blade and the shaft or rod I³, except at the points where the connecting projections I⁴ occur. The scrapers of this general construction may be mounted upon the sides or ends of the scraper-frame in any suitable manner. A cheap and efficient construction is that shown in the drawings, wherein common eyebolts K K' are mounted upon the frame and connected therewith by means of clamping-nuts $k$. Of the two eyebolts forming the bearings for a scraper I have shown the upper one, K, as extending farther from the face of the scraper-frame than the lower one, K', and the arrangement is such that the angular position of the axis of the trunnions or rods I³ supports the outer edge of the scraper in a straight vertical line when the scraper-blade stands in the same plane with or parallel with the plane of the scraper-frame. When, however, the scraper is turned upon its axis of motion, the angular velocity or movement of the lower part of its edge, which is farther from the axis of movement, is greater than the upper part of its edge, which is nearer such axis, and consequently the edge of the scraper assumes an angle to the axis of rotation of the scraper-frame, or, in other words, to a vertical line parallel with the inner face of the vessel, and the lower part of the scraper-blade leads or is in advance of the upper part, as seen in Fig. 7, where the arrows show the direction of rotation of the scraper-frame. The pressure of the oil or other liquid filling the interior of the vessel upon the faces of the scraper-blades forces them against the wall of the vessel, and although the edge of the scraper-blade when at rest forms a short chord of the curved surface of the vessel in practice the edge of the blade scrapes all of the surface over which it travels. This is so because the circumference of the inner face is relatively large and the scraper is relatively short and also because the pressure of the liquid springs or slightly bends the scraper-blade and conforms its edge substantially to the curved surface of the vessel. The scraper-frame and the scrapers mounted thereon may extend, as shown, substantially from the bottom to the top of the inner wall of the vessel, and when the frame is rotated the liquid is quite thoroughly agitated, and the angular arrangement of the blades is such as to cause an upward circulation of the liquid adjacent to the walls of the vessel. In the practical manufacture of cylindrical vessels of the size and kind contemplated it is difficult, if not impossible, to avoid the presence of seams or joints in the inner surface. As one corner or end of the scraping edge leads or is in advance of the other, there is no liability of the edge of the scraper catching in or on any such seam, which might result in breakage, and the leading corner of the scraping edge may be slightly beveled or rounded, so that any possibility of its catching upon the seam or joint is entirely obviated.

To the bottom cross-piece H of the scraper-frame I have shown hinged on opposite sides two scrapers M M, which may be such as shown in full lines, Fig. 7, and may also be extended at the ends, as shown by the dotted lines, so that they shall be in length substantially equal to the radius of the vessel. These scrapers are shown in detail in Figs. 9 and 10, and their surfaces are inclined from their lower edges rearwardly or away from the direction of rotation. They are arranged at an angle to the radius of the vessel, and their angular position is such as to direct the material acted upon by them toward the center of the vessel and to the outlet in the bottom thereof. The casting B is applied at the bottom of the vessel and has a lateral boss and opening B' for the connection of a pipe O. The paraffin-oil or other liquid to be operated upon may be delivered to the vessel by the pipe P, entering the top thereof, and the amount supplied be regulated in any of the well-known ways, so as to maintain a uniform level in the vessel. A pipe Q communicates with the bottom of the annular space between the inner and outer shell of the vessel near the bottom thereof and a pipe Q' near the top thereof. A cooling medium—as cold air, cold water, refrigerated brine, &c.—may be supplied at Q and leave the annular space at Q' to reduce the vessel and its contents to the desired temperature. If the vessel be filled with paraffin-oil and its inner surface be sufficiently chilled, the oil will be congealed and in congealing will deposit upon the inner face of the vessel, from which it is constantly removed by the scraper, the oil being kept in circulation and new portions or quantities thereof constantly brought in contact with the uncoated scraped faces of the vessel. The temperature being sufficiently low, the wax will solidify, the oil assuming a slushy condition, due to the suspension of the solidified wax in it, and being removed as desired and when brought to the proper condition through the pipe O.

In Fig. 13 I have shown a battery or series of four vessels the first of which is provided with the inlet P, while its outlet O is connected with a vertical pipe O', connected at its upper end O² to the second vessel at the fluid-level thereof. The oil or liquid treated in the first vessel A passes to the next, thence to the third, and thence to the fourth, from which in a refrigerated and slush-like condition it is delivered through the pipe O. At this point the vertical pipe O' is also partially shown merely to indicate that there may be still another vessel. This circulation of the oil or liquid through the vessels may be produced by mechanical means; but the plan which I prefer to employ is as follows: I may provide an air-tank, Fig. 13, in which a substantially uniform pressure of air is maintained by any suitable means and from which a pipe R extends. A branch pipe r, equipped with a suitable valve, connects the pipe R to the bottom of each pipe O', so that compressed air in proper quantity (and but a small quantity at comparatively low pressure is required) is admitted to the base of the column of liquid in the pipe O' and rising therein serves to lighten the column and induce a flow upwardly, so that the liquid is delivered from the pipe O' into the next vessel A. The aperture connecting the air-pipe r and the bottom of the vertical pipe O' should or may be relatively small as compared with the cross-section of the pipe O'. The amount of air required is small, and it may be at a pressure of from one to six pounds or thereabout. The pressure and volume of air employed would naturally be regulated to the height and cross-section of the column of material in the pipe O'. Injectors for introducing the air into the pipes O' may or may not be used. Their use is not essential. In practice I may circulate cold water in the jacket of the first or in the first and second vessels A and refrigerated brine in the third and fourth vessels, and brine of a lower temperature may be circulated in the jacket of the fourth vessel than that which is used in the jacket of the third vessel. I have indicated by the dotted line in Fig. 13 what may be the fluid-level.

Diagram 1 shows a circulation of cold water in the jackets of the first two vessels. The cold water enters the bottom of the jacket of the second vessel and from its top passes to the bottom of the jacket of the first vessel, from which it escapes at the top. The other two vessels (marked A³ A⁴) are cooled by a refrigerated-brine circulation, which enters the bottom of the jacket of the last of the vessels and leaves at the top of the jacket of the third vessel.

Diagram 2 shows a cold-water circulation in the jacket of the first vessel and in the jacket of the second vessel a circulation of cold oil which has been pressed from the wax in an ordinary filter-press and pumped back to the vessel A². The remaining vessels A³ A⁴ are cooled by a brine circulation, the connections being the same as in Diagram 1. Of course other arrangements may be adapted according to the requirements in any given case.

By the organization herein described I am enabled to very rapidly, efficiently, and economically solidify the wax and paraffin-oil and to deliver it in the usual slushy condition, or, I should say, in a better such condition than has been obtainable by old methods, to the compression-machines or filter-presses for eliminating the free oil or other constituents and reducing the wax to the form of solidified cakes or masses.

As the wax is scraped from the interior of the vessels immediately after being deposited thereon, the deposit is in the form of a mere film, which by the action of the scrapers is more or less broken up and mixed with the fluid oil, forming a slush of quite a uniform character, which tends to flow with facility from one vessel to another.

The apparatus and the way of using it are such, as above suggested, that the refrigerating medium in the first of the vessels is not at so low a temperature as in the later or last of the vessels. Consequently there is a gradual chilling of the oil. At the lowest temperature to which it is subjected in the last or some of the later vessels it may at times, owing to the solidification of the wax, "set," so as to clog in the vertical pipes leading from the bottom of one vessel to the top of the next. Should this occur, the normal flow of the slush is restored by admitting at the bottom of the vertical transfer-pipe an increased volume of compressed air. This may readily be done by manipulation of the cocks shown in the air-pipes in Fig. 13, or of course the increased volume of compressed air may be otherwise supplied when needed.

I claim as my invention—

1. The combination of two or more vessels having separate jackets for the circulation of cooling medium, means for circulating a cooling medium in the jacket or jackets of the first or earlier vessels in the series, means for circulating a cooling medium of lower temperature in the jacket of the final or later vessels of the series, scrapers for removing solidified matter from the inner walls of the vessels and mixing it with the oil therein to form a slush, suitable connections between the vessels for the passage of the slush from one vessel to another and an outlet for the discharge of the slush from the last vessel.

2. The combination of two or more vertical cylindrical vessels having jackets for the circulation of a cooling medium, a connection from the bottom of the interior of one first or earlier in the series to the upper part of the interior of the next one and a discharge-outlet from the last one of the series, scrapers operated in each vessel to remove solidified matter from the interior faces thereof, a source of compressed-air supply and connections for admitting compressed air to the pipe or connection through which a column of liquid passes from the bottom of one vessel to the upper part of the next one.

3. The combination of a cylindrical vessel, a scraper-frame rotated therein, a series of scraper-blades carried by the frame and each capable of rocking on an axis in the plane of but inclined to the edge of the scraper.

4. The combination of a cylindrical vessel, and a scraper rotating therein in contact with its interior surface and capable of rocking on an axis in the same plane as the axis of rotation of the scraper but inclined to said axis of rotation.

5. The combination of a cylindrical vessel, a scraper-frame rotating therein, and a series of scrapers hinged to the edges of the frame and acting on the interior surface of the vessel, the axis of each scraper being at one end nearer to the edge of the scraper than to the axis of rotation of the frame and at the other end nearer to the axis of rotation of the frame than to the edge of the scraper.

6. The combination of a cylindrical vessel, a scraper-frame rotating therein, and scrapers rotating with the frame and against the surface of the vessel with their edges inclined to the axis of the vessel, one end of the scraping edge being in advance of the other.

7. The combination of the cylindrical vessel, the scraper-frame rotating therein, eyebolts attached to the edge of the frame and forming bearings for hinged scrapers, one of a pair of eyebolts forming the bearings for a scraper being nearer to the axis of the cylinder, and a scraper having a shaft or trunnions correspondingly at different distances from its scraping edge and mounted in said eyebolt-bearings.

8. The combination of a series of two or more vertical cylindrical vessels having jackets for the circulation of a cooling medium, the bottom of the interior of a vessel first or earlier in the series being connected to the upper part of the interior of the vessel next in the series and the last vessel having a discharge-outlet at its bottom, and scrapers rotating in each vessel against the surface thereof with their edges inclined to the axis of the vessel so that one end of the scraping edge of a scraper is in advance of the other end.

9. The combination of a series of two or more vertical cylindrical vessels, having jackets for the circulation of a cooling medium, the bottom of the interior of a vessel first or earlier in the series being connected to the upper part of the interior of the vessel next in the series and the last vessel having a discharge-outlet at its bottom, scrapers rotating in each vessel against the surface thereof with their edges inclined to the axis of the vessel so that one end of the scraping edge of a scraper is in advance of the other end, and one or more scrapers acting upon the bottom of the vessel to direct the contents thereof to the outlet in the bottom thereof.

10. The combination of a vertical cylindrical vessel having an opening in the bottom thereof, hinged scrapers rotating in the vessel and against the surface thereof with their edges at an angle to the axis of the vessel so that one end of the edge of each scraper is in advance of the other, and one or more rotating scrapers acting upon the bottom of the vessel and arranged at an angle to its radius so as to direct the contents of the vessel to the opening in the bottom thereof.

In testimony whereof I have hereunto subscribed my name.

PHILANDER R. GRAY.

Witnesses:
LLOYD B. WIGHT,
WALTER REEVES TUBBS.